(12) United States Patent
Oh et al.

(10) Patent No.: US 7,206,565 B2
(45) Date of Patent: Apr. 17, 2007

(54) DEVICE FOR GENERATING WIDE TUNABLE FREQUENCY USING FREQUENCY DIVIDER

(75) Inventors: Seung Min Oh, Chunlabook-do (KR); Hyo Seok Kwon, Kyungki-do (KR); Yoo Sam Na, Seoul (KR); Gi Won Choi, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 492 days.

(21) Appl. No.: 10/421,700

(22) Filed: Apr. 24, 2003

(65) Prior Publication Data
US 2004/0106390 A1 Jun. 3, 2004

(30) Foreign Application Priority Data
Dec. 3, 2002 (KR) ............... 10-2002-0076141

(51) Int. Cl.
*H04B 1/26* (2006.01)
(52) U.S. Cl. ............... 455/313; 455/318; 455/319
(58) Field of Classification Search ............... 455/318, 455/319, 94, 75, 76, 77, 131, 136, 138, 141, 455/154.1, 160.1, 161.2, 161.3, 164.1, 164.2, 455/179.1, 181.1, 182.2, 182.3, 183.1
See application file for complete search history.

(56) References Cited

U.S. PATENT DOCUMENTS

| | | | | |
|---|---|---|---|---|
| 5,319,800 A | * | 6/1994 | Erbora et al. | .......... 455/78 |
| 5,373,264 A | | 12/1994 | Higgins, Jr. | |
| 6,816,021 B2 | * | 11/2004 | Hahn et al. | .......... 331/74 |
| 2003/0040292 A1 | * | 2/2003 | Peterzell et al. | ........ 455/147 |
| 2003/0134609 A1 | * | 7/2003 | Kasperkovitz et al. | ...... 455/255 |
| 2004/0077327 A1 | * | 4/2004 | Lim et al. | .......... 455/318 |
| 2005/0272395 A1 | * | 12/2005 | Sorrells et al. | .......... 455/319 |

FOREIGN PATENT DOCUMENTS

| | | |
|---|---|---|
| JP | 60-083406 | 5/1985 |
| JP | 2002-164784 | 6/2002 |

* cited by examiner

*Primary Examiner*—Duc M. Nguyen
*Assistant Examiner*—Justin Lee
(74) *Attorney, Agent, or Firm*—Lowe Hauptman & Berner, LLP.

(57) ABSTRACT

The present invention relate to a wideband frequency generating apparatus using a frequency dividing method of dividing a frequency signal of a voltage control oscillator to expand a frequency generating range. The apparatus comprises an oscillator unit generating a predetermined frequency signal, a mixer having a first input coupled to the oscillator unit to generate a difference signal by mixing the predetermined frequency signal with a signal inputted to a second input of the mixer, a first switch tuned on/off and coupling the predetermined frequency signal to an output of the mixer, a second switch turned on/off and coupling the output of the mixer to the second input of the mixer to form a feedback loop, a ½ frequency divider dividing the output of the mixer by ½ to generate a divided signal, a third switch tuned on/off and coupling the divided signal of the ½ frequency divider to the second input of the mixer unit, and a control logic unit generating on/off control signals turning on/off the mixer, the first switch, the second switch, the third switch in accordance with a selection of frequency generating ranges.

5 Claims, 15 Drawing Sheets

| AB | Ctrl#1 | Ctrl#2 | Ctrl#3 | Ctrl#4 | Ctrl#5 |
|----|--------|--------|--------|--------|--------|
| 00 | OFF | ON | ON | OFF | OFF |
| 01 | OFF | OFF | ON | ON | OFF |
| 11 | OFF | OFF | ON | OFF | ON |
| 10 | ON | ON | OFF | OFF | OFF |

FIG. 11

DEVICE FOR GENERATING WIDE TUNABLE FREQUENCY USING FREQUENCY DIVIDER

CROSS-REFERENCE TO RELATED APPLICATION

This application claims to benefit of Korean Patent Application No. 2002-76141, filed Dec. 3, 2002, in the Korean Intellectual Property Office, the disclosure of which is incorporated herein by reference.

BACKGROUND OF THE INVENTION

1. Field of the Invention

The present invention relates to a wide band frequency generating apparatus used as a local oscillator in a wireless receiver, such as a wireless modem, a wireless phone, a TV receiver, and more particularly, to a wide band frequency generating apparatus for expanding a tuning range using a frequency dividing method of dividing an oscillating frequency of an oscillator.

2. Description of the Related Art

Generally, an oscillator (OSC) is known as an apparatus for generating alternative current signal having a predetermined frequency and has been used in a wireless receiving apparatus for transmitting and receiving a signal through a predetermined channel, such as a wireless phone, a wireless modem, and a television receiver.

FIG. 1 is a conventional direct conversion type tuner in a wireless receiver. As shown in FIG. 1, the direct conversion type tuner includes mixers 3, 4 mixing a predetermined frequency input signal RFin having a predetermined level adjusted by a pre-amp 1 and an automatic gain controller (AGC) 2 with corresponding ones of oscillation signals Fo1, Fo2 generated from a local oscillator 5 to I and Q signals of a base band. The local oscillator 5 outputs the oscillation signals Fo1, Fo2 having the same frequency and a different phase angle, e.g., a phase difference of 90 degrees, to the mixers 3, 4. The local oscillator 5 may include an oscillator generating a frequency signal having the same frequency as a carrier of a selected channel, and a signal divider dividing the frequency signal into the oscillation signals Fo1, Fo2 having the different phase angle, e.g., the phase difference of 90 degrees.

The mixers 3,4 mix the frequency input signal RFin with corresponding ones of the oscillation signals Fo1, Fo2 to output sum signals and difference signals, respectively. The sum signals are not used since a frequency of the sum signals of the mixers 3, 4 is too high to use in a tuning system. Accordingly, the sum signals of the mixers 3, 4 are ignored by a characteristic of a circuit and parts of the tuning system, and the difference signals of the mixers 3, 4, e.g., the I, Q signals, are output.

Low pass filters (LPF) 6, 7 remove signals other than base band signals corresponding to the I, Q signals from the difference signals output from the mixers 3, 4. When the local oscillator 5 generates the oscillation signals Fo1, Fo2 having the same frequency as the carrier of the selected channel, the frequency input signal RFin having the same frequency as the carrier of the selected channel is mixed with the oscillation signals Fo1, Fo2 to generate the I and Q signals of the base band.

Therefore, the local oscillator 5 should be able to generate the frequency signal corresponding to a frequency receiving (tuning) band (range) of the tuner system. That is, the frequency receiving (tuning) band (range) of the tuner system should be the same as a frequency receiving band of a wireless system.

For example, a broadcasting band used in a satellite system is a range of about 950 MHz~2.15 GHz. Accordingly, the oscillator 5 used in a tuner of a satellite broadcasting receiver should be able to generate a frequency oscillation signal of a band of about 950 MHz~2.15 GHz.

The oscillator 5 should have the frequency tuning range of 125% of the receiving band of the tuner according to a frequency tuning range calculated by a maximum-minimum ratio expression method of expressing an efficiency of the oscillator 5 as follows.

$$\frac{f_{max} - f_{min}}{f_{min}} \times 100[\%]$$

However, the frequency tuning range is about 30% in a voltage control oscillator (VCO) including an internal oscillator in an integrated circuit. In order to expand the frequency tuning range, various developing research activities have been carried out.

As shown in FIG. 2, the VCO generally includes an active circuit 21 outputting an oscillation frequency signal in response to a frequency signal generated from an oscillation circuit 22 which has an inductance and a capacitance to determine a frequency of the frequency signal.

FIG. 3 is a circuit of an active circuit unit of a conventional VCO shown in FIG. 2. In response to an input voltage controlled by control signals A, B, a capacitance value of varactor diodes VD1, VD2 varies. The oscillation frequency signal f is obtained from an inductance L and a capacitance C of varactor diodes VD1, VD2 according to a control voltage Vctrl, which is controlled by control signals A and B by using a formula:

$$f = \frac{1}{2\pi\sqrt{LC}}.$$

In the conventional VCO, since a variable range of the capacitance C of the varactor diodes VD1, VD2 is a major factor in determining the frequency tuning range, the various developing research activities expanding a capacitance variable range of the varactor diodes VD1, VD2 as a method of expanding the frequency tuning range of the oscillator, are performed.

However the expanded frequency tuning range is not able to satisfy industrial demands required in the tuner of the satellite-broadcasting receiver since the expanded frequency tuning range through a development of the varactor diodes is about 40%. Therefore, a plurality of oscillators or another methods of changing the oscillation circuit may be used in the tuner of the satellite-broadcasting receiver.

FIG. 4 is a circuit of another active circuit unit modified from the active circuit unit of the conventional VCO shown in FIG. 2. The another active circuit unit includes a plurality of capacitors C1 through C6 connected in parallel to the varactor diodes VD1, VD2 which are selectively connected to the capacitors C1 through C6 by on and off of a plurality of switch array sw1 through sw6 to expand a total capacitance value Cvar of the oscillation circuit unit 22.

The total capacitance value Cvar of the oscillation circuit unit 22 as shown in FIG. 4, varies according to control signals Vsw1, Vsw2, Vsw3 of the switch array sw1 through sw6. By selecting the capacitors C1 through C6, a center frequency of the oscillation circuit unit 22 varies step by step, and a frequency range between the steps is covered by a variable range of the capacitance of the varactor diodes VD1, VD2 to expand a total frequency variable range of the oscillation circuit unit 22.

In this case, the frequency tuning range may be expanded to 70%~80%. However, at least two oscillators must be used to satisfy the frequency tuning range of 150% which is required in the tuner of the satellite broadcasting receiver as describe above.

Therefore, as shown in FIG. 5, two oscillators are used to satisfy the frequency tuning range of the tuner of the satellite-broadcasting receiver.

Moreover, the active circuit unit of FIG. 4 is added to the oscillation circuit unit installed in an inside of the VCO, a load on the active circuit unit increases, and a current consumption also increases. Furthermore, since a resistance characteristic of the switch array sw1~sw2 provided in the oscillation circuit unit 21 decreases a quality factor of the capacitors, a phase noise of the VCO increases.

SUMMARY OF THE INVENTION

The above and other problems are solved by providing a wideband frequency generating apparatus using a frequency dividing method of dividing a frequency signal of a voltage control oscillator to expand a frequency generating range.

The above and other problems are also solved by providing a wideband frequency generating apparatus using a frequency dividing method of expanding a frequency generating range without adding switches and capacitor array to an oscillation circuit, thereby reducing a current consumption and a phase noise.

Additional aspects and advantages of the invention will be set forth in part in the description which follows and, in part, will be obvious from the description, or may be learned by practice of the invention.

To achieve the above and/or other aspects, a wideband frequency generating apparatus comprises an oscillator unit generating a predetermined frequency signal, a mixer having a first input coupled to the oscillator unit to generate a difference signal by mixing the predetermined frequency signal with a signal inputted to a second input of the mixer, a first switch tuned on/off and coupling the predetermined frequency signal to an output of the mixer, a second switch turned on/off and coupling the output of the mixer to the second input of the mixer to form a feedback loop, a ½ frequency divider dividing the output of the mixer by ½ to generate a divided signal, a third switch tuned on/off and coupling the divided signal of the ½ frequency divider to the second input of the mixer unit, and a control logic unit generating on/off control signals turning on/off the mixer, the first switch, the second switch, the third switch in accordance with a selection of frequency generating ranges.

BRIRF DESCRIPTION OF THE DRAWINGS

These and/or other aspects and advantages of the invention will become apparent and more readily appreciated from the following description of the preferred embodiments, taken in conjunction with the accompanying drawings of which:

FIG. 11 is a diagram showing a logic control unit of the wide band frequency generating apparatus shown in FIG. 10;

DETAILED DESCRIPTION OF THE PREFERRED EMBODIMENTS

Figure 1:
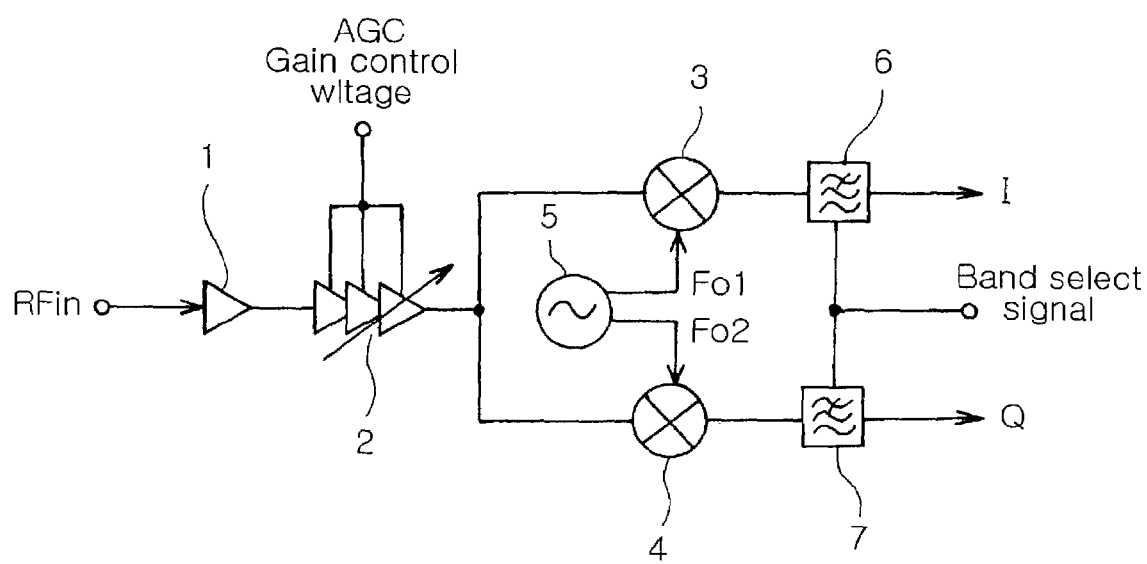
FIG. 1 is a block diagram of a conventional direct conversion type tuner.
Figure 2:
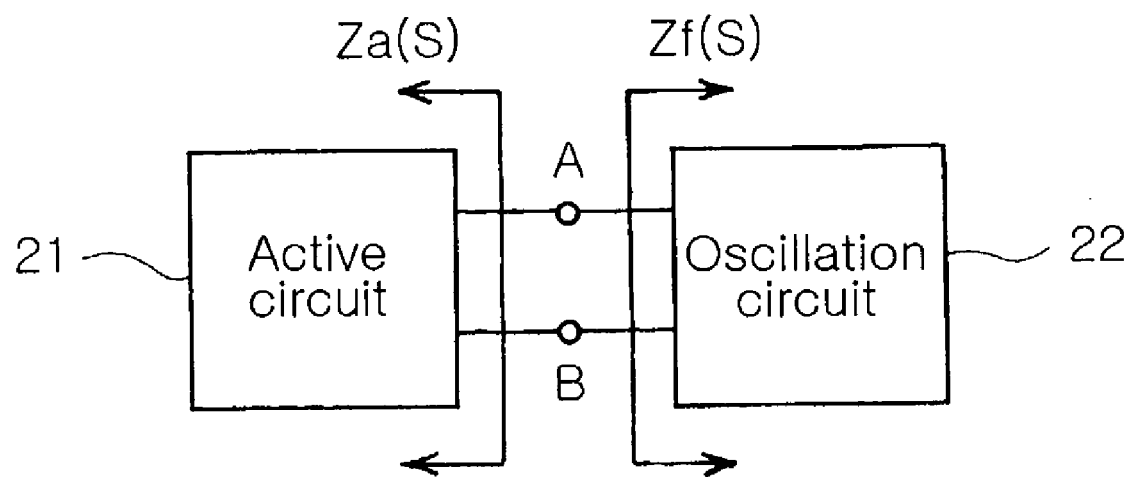
FIG. 2 is a block diagram of a voltage control oscillator of the tuner shown in FIG. 1.
Figure 3:
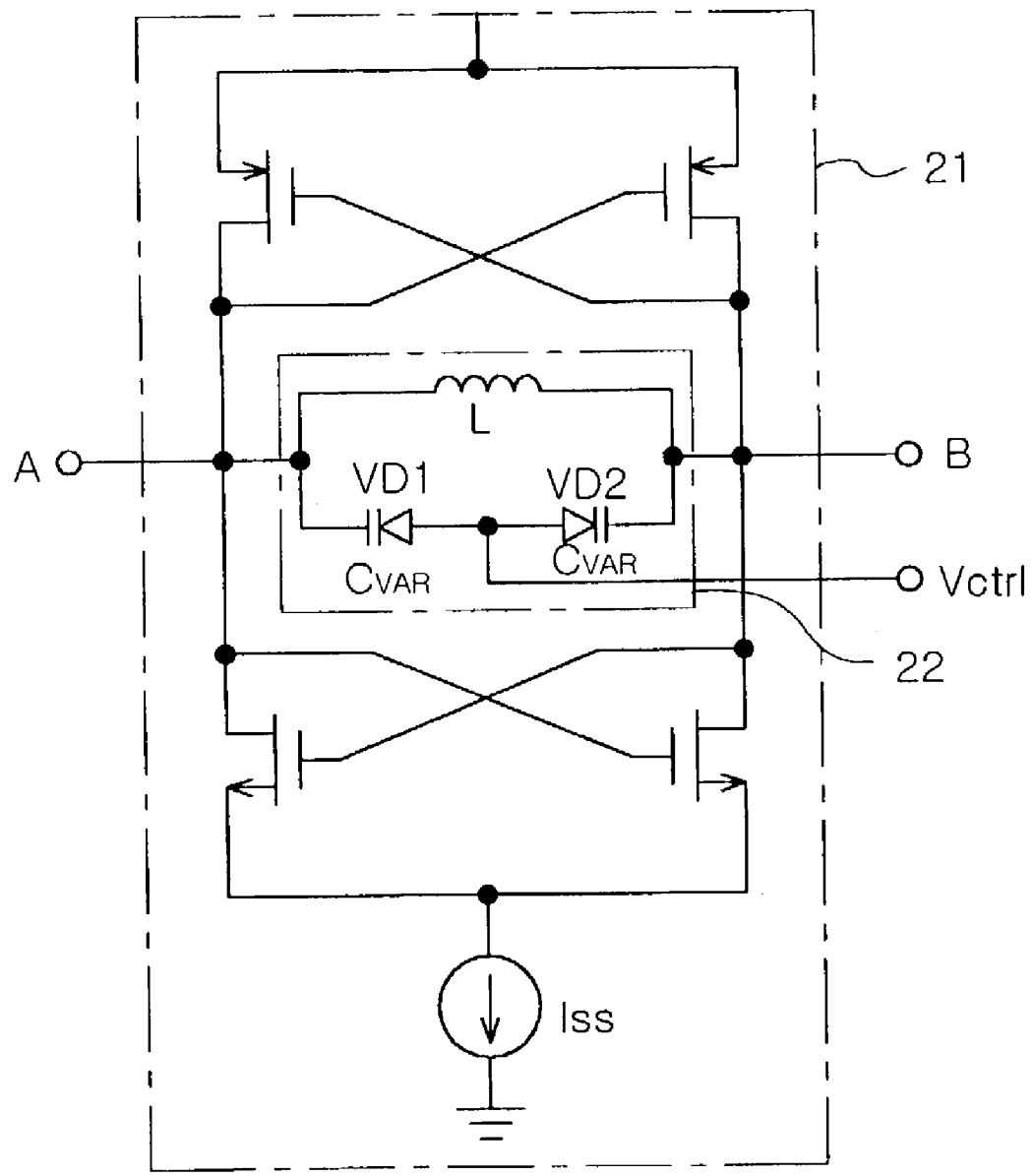
FIG. 3 is a circuit of an active circuit unit of the voltage control oscillator shown in FIG. 2.
Figure 4:
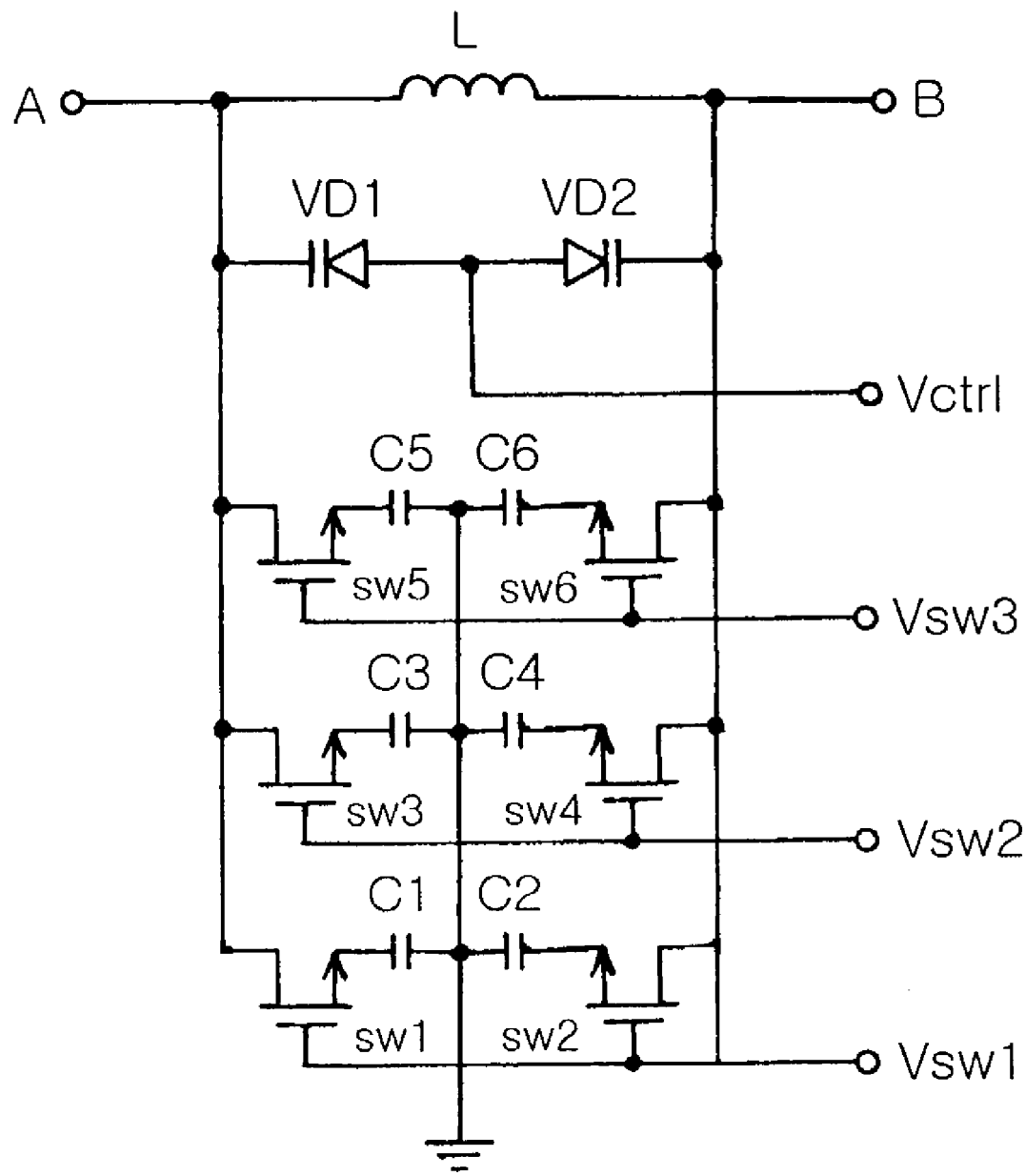
FIG. 4 is a circuit of another active circuit unit of the voltage control oscillator shown in FIG. 2.
Figure 5:
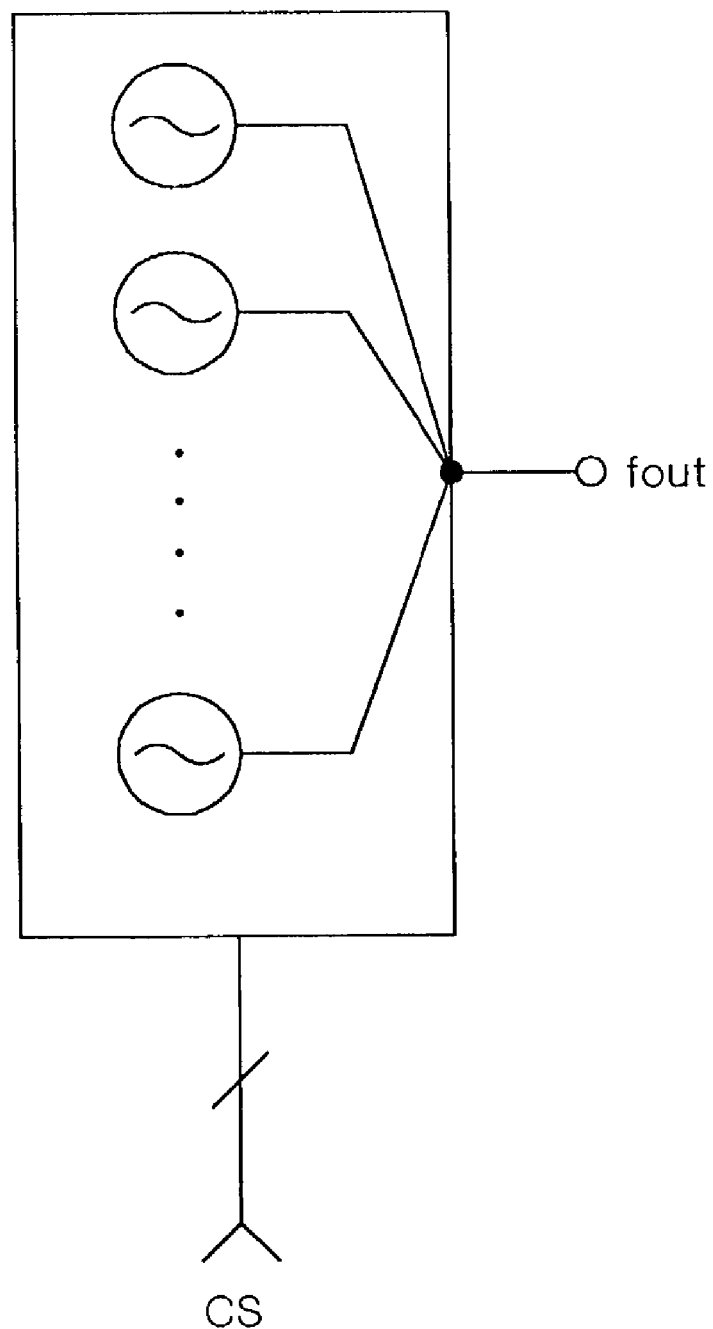
FIG. 5 is a diagram showing an operational principle of the voltage control oscillator shown in FIG. 2.

Reference will now be made in detail to the present preferred embodiments of the present invention, examples of which are illustrated in the accompanying drawings, wherein like reference numerals refer to the like elements throughout. The embodiments are described below in order to explain the present invention by reference to the figures.

Figure 6:
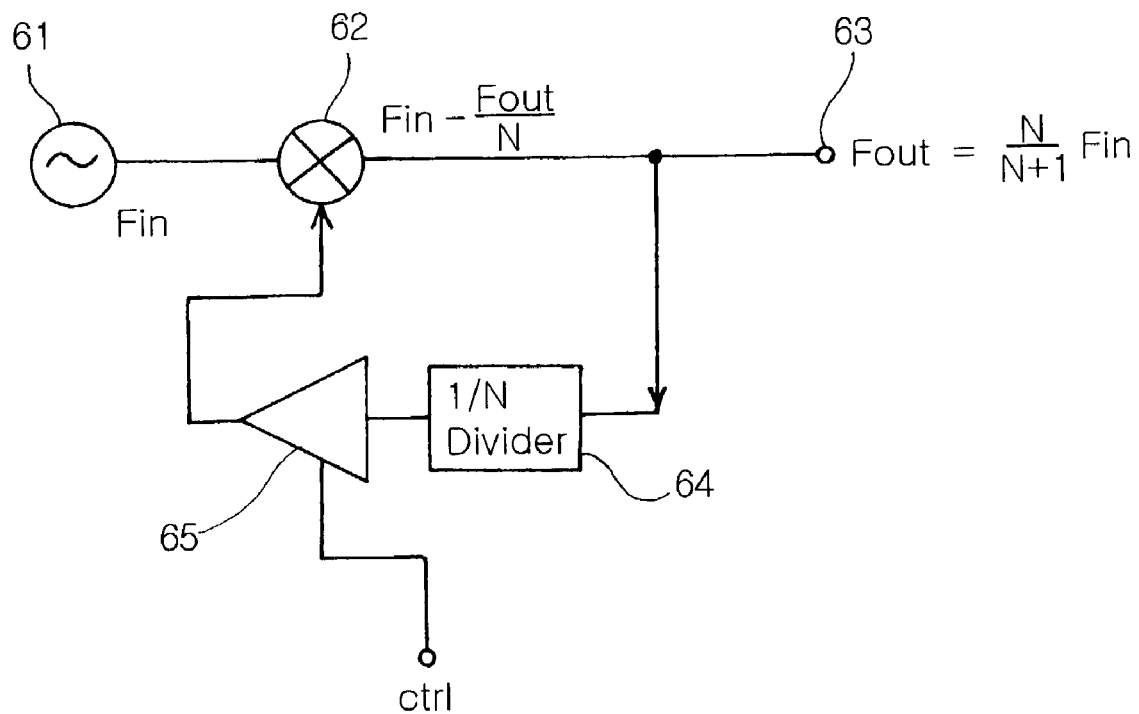
FIG. 6 is a diagram showing a principle of a wide band frequency generating apparatus according to an embodiment of the present invention.

FIG. 6 is a diagram showing a principle of a wide band frequency generating apparatus according to an embodiment of the present invention. A wideband frequency generating apparatus comprises an oscillator unit 61 generating a predetermined frequency signal, a mixer unit 62 having a first input terminal coupled to the oscillator unit 61 to generate a difference signal and a sum signal by mixing the predetermined frequency signal inputted from the oscillator unit 61 through the first input terminal with a signal from a second input terminal of the mixer unit 62, a 1/N frequency divider 64 dividing the predetermined frequency signal of of the oscillator unit 61 into a 1/N frequency signal (N is $2^m$, and m is an integer greater than 0), and a switch 65 turned on/off in response to a control signal ctrl to couple the 1/N frequency signal of the 1/N frequency divider 64 to the second input of the mixer unit 62, thereby forming a feedback loop with the mixer unit 62, the 1/N frequency divider 64, and the switch 65.

Figure 7:
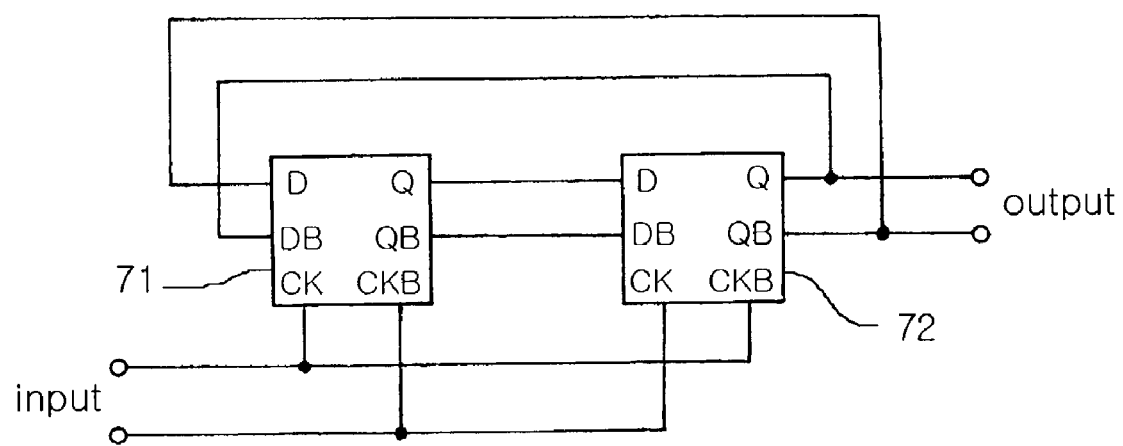
FIG. 7 is a block diagram of a frequency divider of the wide band frequency generating apparatus shown in FIG. 6.
Figure 8A:
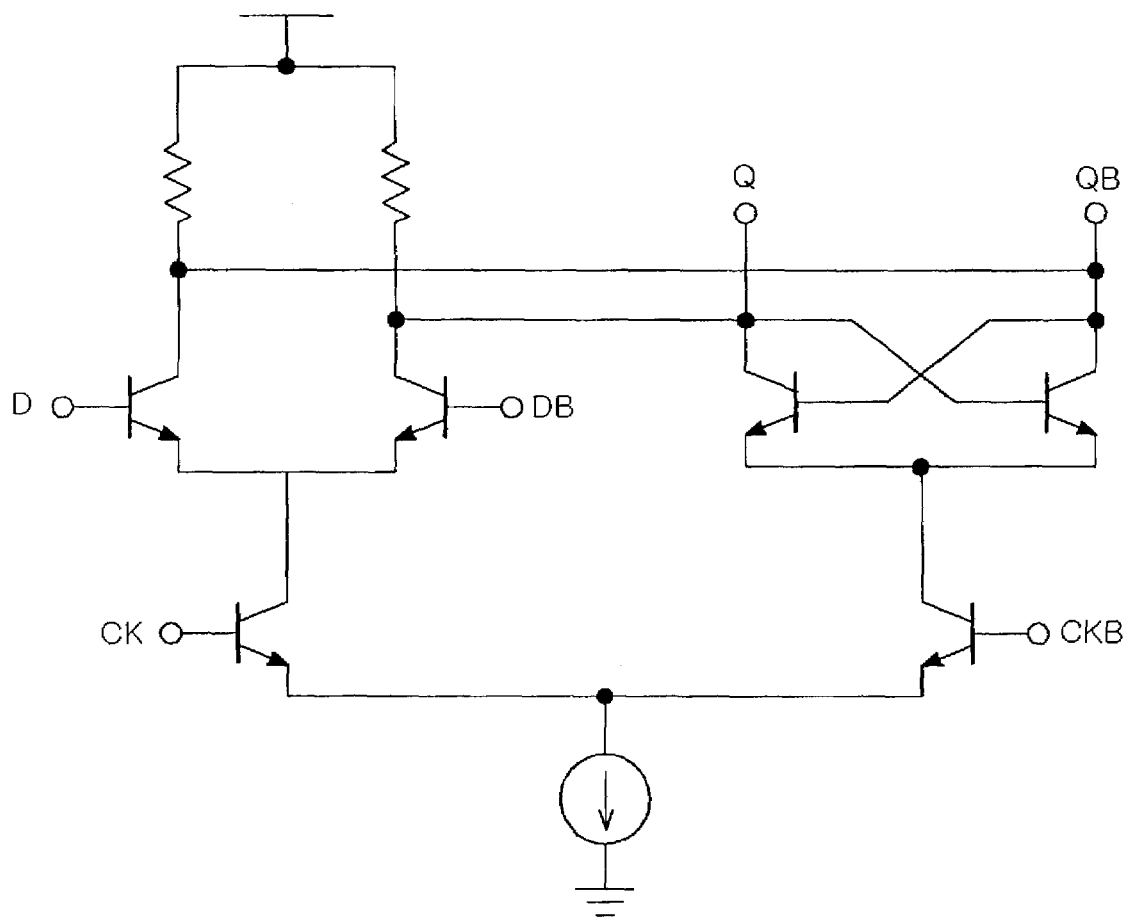
FIGS. 8A and 8B are circuit diagrams of the frequency divider of the frequency generating apparatus shown in FIGS. 6 and 7.
Figure 8B:
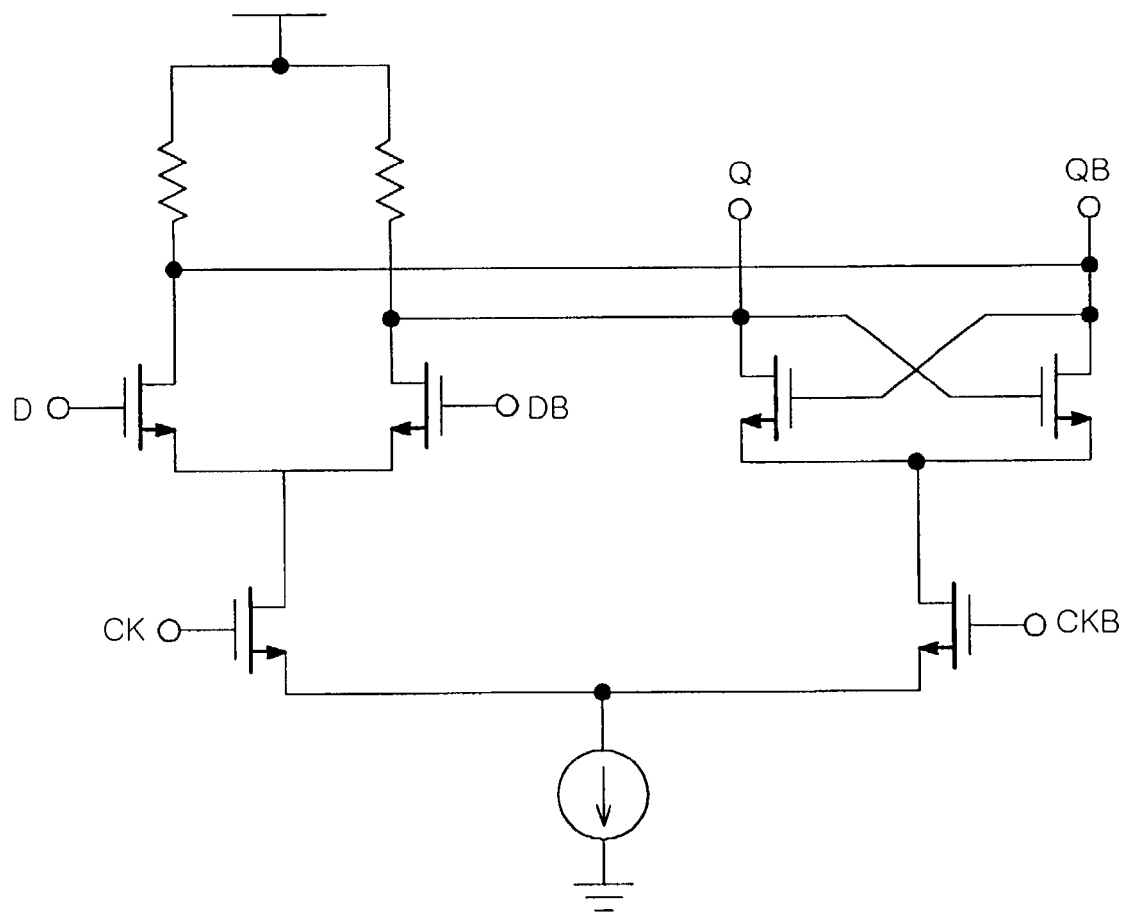

A latch type or ECL-type frequency divider may be used as the 1/N frequency divider 64 and is described in FIG. 7. The latch type or ECL-type frequency divider includes an input, an output, and two D flip-flops 71, 72 having terminals D, Q, DB, QB, CK, and CKB. FIGS. 8A and 8B are circuit diagrams showing a basic structure of the D flip-flops 71, 72 of the 1/N frequency divider 64 of the frequency generating apparatus shown in FIGS. 6 and 7.

The above description of the latch type or ECL-type frequency divider as the 1/N frequency divider 64 is provided for better understanding of the wideband frequency generating apparatus. Accordingly, the 1/N frequency divider 64 is not limited thereto, and any structure performing a frequency dividing function of the 1/N frequency divider 64 may be used.

The structure of the 1/N frequency divider 64 of the wideband frequency generating apparatus as shown in FIG. 6 uses a Miller method, and an operation of the structure of the 1/N frequency divider 64 is explained as follows.

If the frequency signal Fin is generated from the oscillator 61, the frequency signal Fin is transmitted to an output terminal 63 to output an output signal Fout and feedbacks to the 1/N frequency divider 64 to divide the output signal Fout into the 1/N frequency signal. Thus, an output of the 1/N frequency divider 64 is Fout/N.

The output of the 1/N frequency divider 64, e.g., Fout/N, is transmitted to a second input terminal of the mixer unit 62 when the switch 65 is on in response to a control signal ctrl of the controller (not shown in FIG. 6).

The mixer mixes the output of the 1/N frequency divider 64, e.g., Fout/N, inputted to the first input terminal and the frequency signal inputted to the first input terminal to generate a sum signal and a difference signal.

The sum signal is ignored by a circuit and parts characteristic of the wideband frequency generating apparatus since the sum signal is too great to use in the wideband frequency generating apparatus, and the difference signal is outputted to the output terminal 63 as the output signal Fout.

An output frequency of the output signal Fout outputted through the output terminal 63 is expressed by the following formula 1.

$$F_{out} = F_{in} - \frac{F_{out}}{N}$$
$$\therefore F_{out} = \frac{N}{N+1} F_{in}$$

Formula 1

Thus, the output frequency of the output signal Fout of the output terminal 63 varies by a value of N of the frequency divider 64.

For example, If N is 2, the output frequency of the output signal Fout of the output terminal 63 is Fout=⅔ Fin, that is, a signal having a ⅔ frequency of the frequency signal of the oscillator 61 is outputted. If N is 3, the output frequency of the output signal Fout of the output terminal 63 is Fout=¾ Fin, that is, a signal having a ¾ frequency of the frequency signal of the oscillator 61 is outputted.

If the 1/N frequency divider 64 is not used in the wideband frequency generating apparatus, and the output signal Fout is transmitted to the second input terminal of the mixer unit 62, N is regarded as 1, and the output signal Fout of the output terminal 63 is ½ Fin.

Accordingly, when an input frequency range of the frequency signal of the oscillator 61 is fmin~fmax, an output frequency range of the output signal Fout of the output terminal 63 is ½ fmin~½fmax if the 1/N frequency divider 64 is not used, that is, N is 1. The output frequency range of the output signal Fout of the output terminal 63 is ⅔ fmin~⅔ fmax if N is 2. The output frequency range of the output signal Fout of the output terminal 63 is ¾ fmin~¾ fmax if N is 3. The output frequency range of the output signal Fout of the output terminal 63 is ⅘ fmin~⅘ fmax if N is 4.

Figure 9:
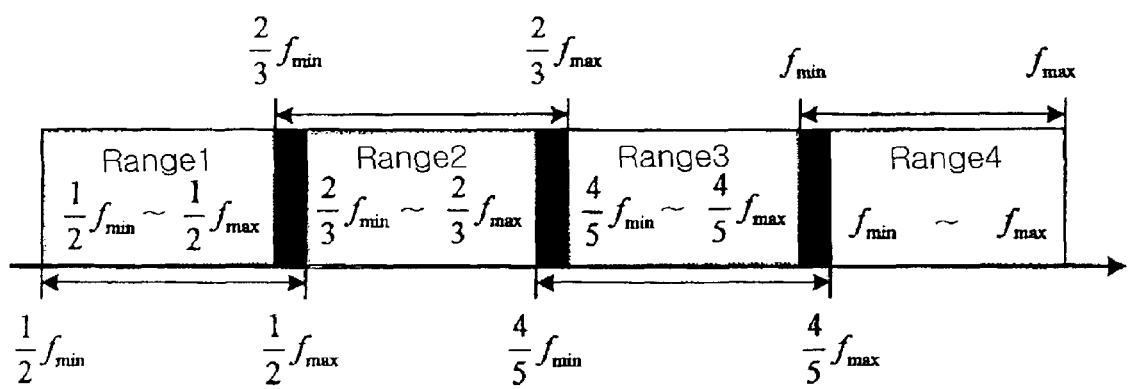
FIG. 9 is a diagram showing an operation and frequency ranges of the frequency generating apparatus shown in FIG. 6.

Respective output frequency ranges Range 1, Range 2, Range 3, and Range 4 of the output signal Fout of the output terminal 63 are shown in FIG. 9. Any gap should not exist between adjacent output frequency ranges Range 1, Range 2, Range 3, and Range 4 so that all output frequency ranges are used as a frequency tuning range of the wideband frequency generating apparatus. The gap is indicated as a black portion in FIG. 9. In order to provide the frequency tuning range required in the wideband frequency generating apparatus using the above described frequency-dividing method, a desirable condition is represented by the following formula 2.

$$\frac{1}{2} f_{max} > \frac{2}{3} f_{min} \Rightarrow f_{max} > \frac{4}{3} f_{min}$$
$$\frac{2}{3} f_{max} > \frac{4}{5} f_{min} \Rightarrow f_{max} > \frac{12}{10} f_{min}$$
$$\frac{4}{5} f_{max} > f_{min} \Rightarrow f_{max} > \frac{5}{4} f_{min}$$

Formula 2

According to the formula 2 representing an input frequency range of the frequency signal Fin of the oscillator 61 using a minimum-maximum ration method relating to the frequency tuning range of the wideband frequency generator, fmax>4/3 fmin represents that the frequency tuning range of the oscillator 61 must be greater than 33%. The formula fmax>12/10 fmin represents that the frequency tuning range of the oscillator 61 must be greater than 20%. The formula fmax>5/4 fmin represents that the frequency tuning range of the oscillator 61 must be greater than 25%.

If the frequency tuning range of the oscillator 61 is determined to be 40% in consideration of a manufacturing process of the wideband frequency generating apparatus, the respective frequency tuning ranges of the FIG. 9 may be extended (expanded) using the structure of FIG. 6. Since a maximum frequency of the frequency signal Fin of the oscillator 61 is fmax=7/5 fmin, an expandable frequency tuning range is ½ fmin~fmax, that is, ½ fmin~7/5 fmin, and a total frequency tuning range wideband frequency generating apparatus is extended 180%.

Figure 10:
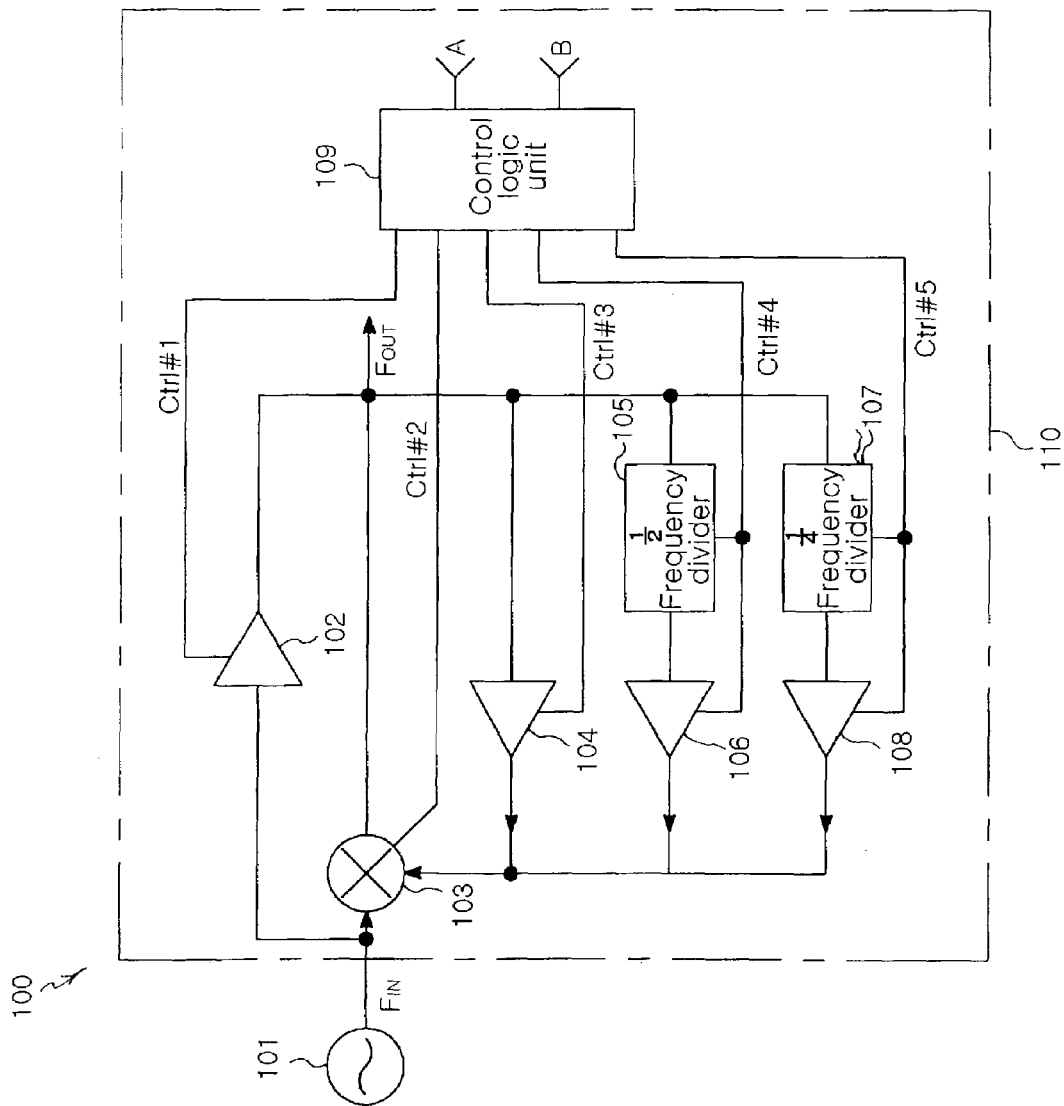
FIG. 10 is a block diagram of another wide band frequency generating apparatus according to another embodiment of the present invention.

FIG. 10 is a block diagram of another wideband frequency generating apparatus 100 according to another embodiment of the present invention, and shows an overall structure of the wideband frequency generating apparatus 100 having the frequency tuning ranges of FIG. 9.

As shown in FIG. 10, the wideband frequency generating apparatus 100 includes an oscillator unit 101 generating a predetermined frequency signal with a variable frequency range, and a tuning range expanding (extending) circuit unit 110 dividing an output signal Fin of the oscillator 101 to expand (extend) a frequency tuning range.

The tuning range expanding circuit unit 110 includes a first switch 102 tuned on/off and coupling the predetermined frequency signal to an output terminal to output an output signal Fout, a mixer 103 having a first input coupled to the oscillator unit 101 to receive the frequency signal of the oscillator unit 101 and generating a difference signal as the output signal Fout by mixing the predetermined frequency signal of the oscillator unit 101 with a signal from a second input terminal, a second switch 104 turned on/off and coupling the output signal Fout of the mixer 103 to the second input of the mixer 103 to form a feedback loop, first and second frequency dividers 105, 107 dividing the output signal of the mixer 103 into ½ and ¼ frequency signals, respectively, third and fourth switches 106, 108 turned on/off and coupling the ½ and ¼ frequency signal of the ½ and ¼ frequency dividers 105, 107 to the second inpu of the mixer 103, and a control logic unit 109 generating first through fifth on/off control signals ctrl#1 through ctrl#5 to turn on/off the mixer 103, the first switch 102, the second switch 104, the third switch 106, and the fourth switch 108 in accordance with a selection of frequency tuning ranges, respectively.

Any other type of an oscillator may be used as the oscillator unit 101 of the wideband frequency generating apparatus 100 if the frequency tuning ranges of the oscillator unit 101 of the wideband frequency generating apparatus 100 can be obtained from the other type of the oscillator.

The logic control unit 109 generates the first through fifth on/off control signals ctrl#1 through ctrl#5 to turn on/off the mixer 103, the first switch 102, the second switch 104, the third switch 106, and the fourth switch 108 in response to the external control signals A, B to select one of the frequency generating ranges Range 1 through Range 4 shown in FIG. 9. The logic control unit 109 may have an operation as shown in FIG. 11 according to the selected frequency tuning ranges. The operation of the logic control unit 109 may be performed as follows.

When the first switch 102 is on, and the mixer 103 is off, the frequency signal Fin of the oscillator unit 101 is transmitted to the output terminal through the first switch 102 as the output signal Fout, thereby outputting the frequency signal Fin of the oscillator unit 101 as the output signal Fout without modifying the frequency signal Fin of the oscillator unit 101. A frequency range of the output signal Fout is the same as the frequency range fmin~fmax of the oscillator unit 101 and corresponds to the fourth frequency tuning range Range 4.

When the first switch 102 is off, and the mixer 103 and the second switch 104 are on, the output signal Fout is transmitted to the second input of the mixer 103 to form a Miller type divider. ½ Fin is output to the output terminal as the output signal Fout by dividing the frequency signal fin into the ½ Fin. If the input frequency range of the frequency signal of the oscillator 101 is fmin~fmax, the output frequency range of the output signal Fout is ½ fmin~½ fmax which corresponds to the first range Range 1 of FIG. 9.

When the first switch 102 is off, and the mixer 103, the third switch 106, and the first frequency divider 105 are on, the output signal Fout is transmitted to the second input of the mixer 103 through the first frequency divider 105 and the third switch 106 to form a ⅔ dividing circuit. ⅔ Fin is output to the output terminal as the output signal Fout by dividing the frequency signal fin into the ⅔ Fin. If the input frequency range of the frequency signal of the oscillator 101 is fmin~fmax, the output frequency range of the output signal Fout is ⅔ fmin~⅔ fmax which corresponds to the second range Range 2 of FIG. 9.

When the first switch 102 is off, and the mixer 103, the fourth switch 106, and the second frequency divider 107 are on, the output signal Fout is transmitted to the second input of the mixer 104 through the second frequency divider 107 and the fourth switch 108 to form a ⅘ dividing circuit. ⅘ Fin is output to the output terminal as the output signal Fout by dividing the frequency signal fin into the ¾ Fin. If the input frequency range of the frequency signal of the oscillator 101 is fmin~fmax, the output frequency range of the output signal Fout is ⅘ fmin~⅘ fmax which corresponds to the third range Range 3 of FIG. 9.

Therefore, the frequency tuning range of ½ fmin~fmax is generated from the oscillator unit 101 having the frequency range of fmin~fmax by using the first through fifth on/off control signals through ctrl#1 to ctrl#5. The minimum frequency fmin and the maximum frequency fmax generated from the oscillator unit 101 should be satisfied with the Formula 2.

The above operation is explained as an example that the frequency tuning range of the oscillator unit 101 is satisfied with 33% according to Formula 2. However, a structure of the wideband frequency generating apparatus 100 can be modified according to the frequency tuning range of the wideband frequency generating apparatus 100.

For example, if the frequency tuning range of the oscillator unit 101 is larger than 40%, the wideband frequency generating apparatus 100 does not need the ¼ frequency divider 107 and the fourth switch 108. That is, the frequency tuning range of ½ fmin~fmax can be obtained from the wideband frequency generating apparatus 100 with the oscillator unit 101, the first through third switches 102, 104, and 106, the mixer 103, and the ½ frequency divider 105.

If the frequency tuning range of the oscillator unit 101 is larger than 50%, the frequency tuning range of ½ fmin~fmax can be obtained from the wideband frequency generating apparatus 100 with the oscillator unit 101, the first and second switches 102 and 104, and the mixer 103.

Table 1 shows the output frequency range of the output signal Fout according to the on/off control signals, the frequency tuning range, and the output frequency range of the output signal Fout according a tuning value of the oscillator unit 101 relating to the input frequency range of the frequency signal.

TABLE 1

| Switching terminal | Range 1 | Range 2 | Range 3 | Range 4 |
|---|---|---|---|---|
| CTRL#1 | OFF | OFF | OFF | ON |
| CTRL#2 | ON | ON | ON | OFF |
| CTRL#3 | ON | OFF | OFF | OFF |
| CTRL#4 | OFF | ON | OFF | OFF |
| CTRL#5 | OFF | OFF | ON | OFF |
| Frequency range | ½ fmin~ ½ fmax | ⅔ fmin~ ⅔ fmax | ⅘ fmin~ ⅘ fmax | fmin~fmax |
| Example#1(35%) Input frequency range 1.7 GHz~2.3 GHz | 0.85 GHz~ 1.15 GHz | 1.13 GHz~ 1.53 GHz | 1.36 GHz~ 1.84 GHz | 1.7 GHz~ 2.3 GHz |
| Output Frequency Range | 0.85 GHz~2.3 GHz (170)% | | | |

TABLE 1-continued

| Switching terminal | Range 1 | Range 2 | Range 3 | Range 4 |
|---|---|---|---|---|
| Example#2(40%) Input frequency range 1.6 GHz~2.24 GHz | 0.8 GHz~ 1.12 GHz | 1.06 GHz~ 1.49 GHz | 1.28 GHz~ 1.79 GHz | 1.6 GHz~ 2.24 GHz |
| Output Frequency Range | 0.8 GHz~2.24 GHz (180)% | | | |
| Example#3(40%) Input frequency range 1.8 GHz~2.52 GHz | 0.9 GHz~ 1.26 GHz | 1.2 GHz~ 1.68 GHz | 1.44 GHz~ 2.02 GHz | 1.8 GHz~ 2.52 GHz |
| Output Frequency Range | 0.9 GHz~2.52 Hz (180)% | | | |

As shown in Table 1, a frequency variable range (output frequency range) of 170% is obtained from the oscillator unit 101 having the frequency variable range (input frequency range) of 35% in the wideband frequency generating apparatus 100, and the frequency variable range of 180 can be obtained from the oscillator unit 101 having the frequency range of 40% in the wideband frequency generating apparatus 100.

The wideband frequency generating apparatus 100 does not includes any additional switching array in the oscillating circuit of the oscillator unit 101. Moreover, an expanding effect of the frequency variable range can be obtained from the wideband frequency generating apparatus 100 by dividing the frequency signal of the oscillator unit 101, and a phase noise occurring due to a resistance of a switching element can be prevented in the wideband frequency generating apparatus 100.

Since a load of an active circuit disposed in the oscillator unit 101 is reduced, a current consumption of the wideband frequency generating apparatus 100 is decreased.

Figure 12:
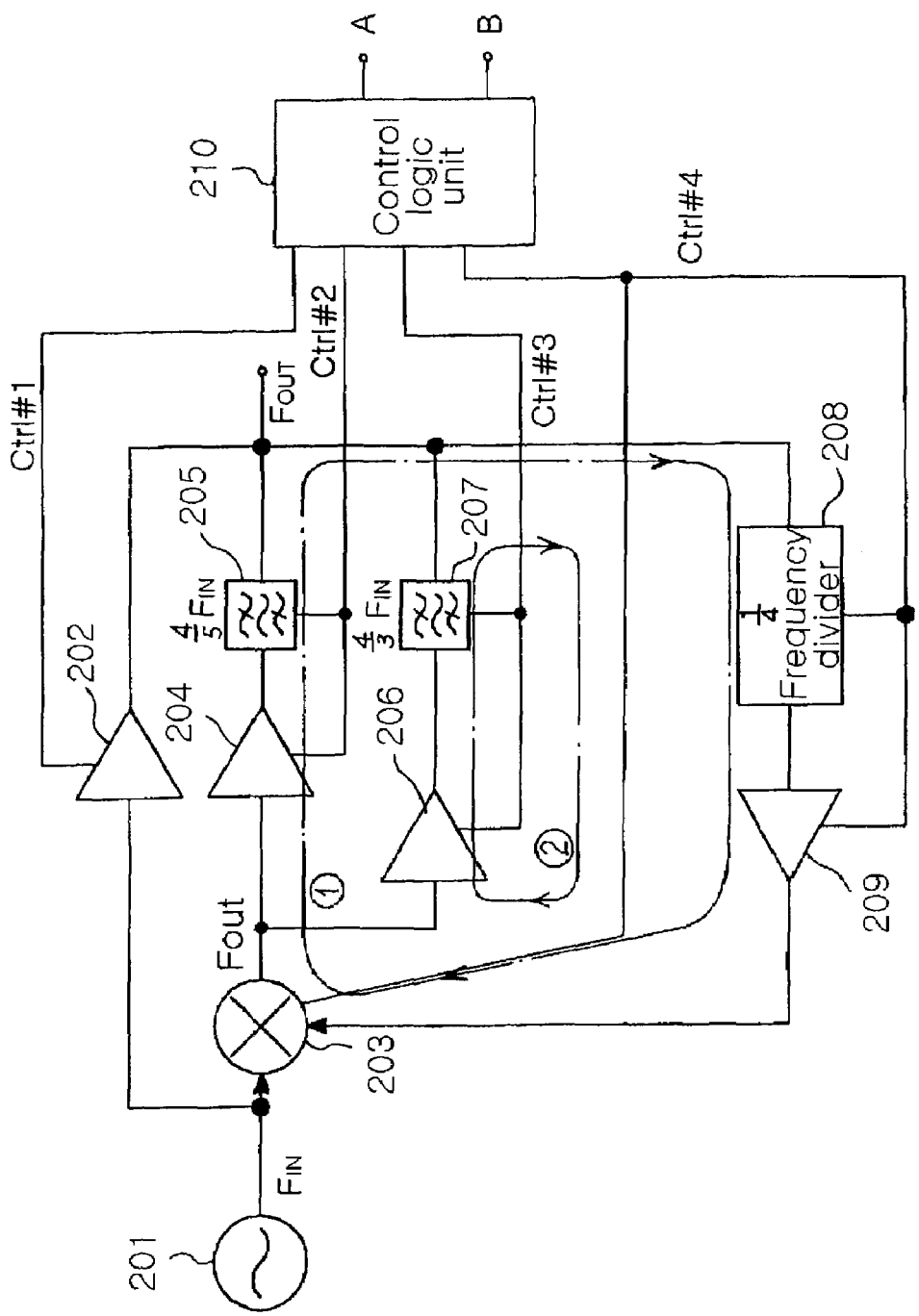
FIG. 12 is a block diagram of another wide band frequency generating apparatus according to another embodiment of the present invention.

FIG. 12 is a block diagram of another wide band frequency generating apparatus according to another embodiment of the present invention. The wideband frequency generating apparatus includes an oscillator unit 201 generating a predetermined frequency signal fin with a variable frequency range, a first switch 202 turned on/off and coupling the predetermined frequency signal Fin of the oscillator unit 201 to an output terminal to output an output signal Fout, a mixer 203 having a first input coupled to the oscillator unit 201 to receive the frequency signal of the oscillator unit 101 and generating a sum signal and a difference signal as the output signal Fout by mixing the predetermined frequency signal of the oscillator unit 101 with a signal inputted to a second input of the mixer 203, second and third switches 206, 206 turned on/off and coupled to the mixer 203 to receive an output of the mixer 203, a first band pass filter (BPF) 205 disposed between the mixer 203 and the output terminal to pass a band having ⅘ Fin, a second band pass filter (BPF) 207 disposed between the third switch 206 and the output terminal to pass another band having ⅘ Fin, a ¼ frequency divider 208 coupled to the output terminal to divide the output signal Fout into a ¼ frequency signal, a fourth switch 209 transmitting an output of the ¼ frequency divider 208 to the mixer 203, and a control logic unit 210 generating first through fourth control signals ctrl#1 through ctrl#4 in response to external signals A and B to turn on the first switch 202 when a second range is selected, turn on the mixer 203, the second switch 204, the first BPF 205, the frequency divider 208, and the fourth switch 209 When a third range is selected, and the first switch 202 when a first range is selected, turn on the mixer 203, the third switch 206, the second BPF 207, the frequency divider 208, and the fourth switch 209 when a first range is selected the first range switch 202 is on An operation of the wideband frequency generating apparatus using the sum signal outputted from the mixer 203 is explained hereinafter.

According to the first control signal ctrl#1 generated from the control logic unit 210, the first switch is on, and the frequency signal of the oscillator unit 201 is transmitted to the output terminal as the output signal Fout. If the input frequency range of the frequency signal of the oscillator unit 201 is fmin~fmax, the output frequency range of the output signal Fout, e.g., the frequency tuning range according to the frequency signal of the oscillator unit 210 itself, is obtained as shown in the first range Range 1 of FIG. 13.

In consideration of the sum signal and the difference signal generated from the mixer 203 according to the input and output signals Fin and Fout as shown in FIG. 6, the output signal Fout is expressed by the Formula 3.

$$Fout = \frac{N}{N \pm 1} Fin \qquad \text{Formula 3}$$

Where, N is a dividing ratio of a frequency divider.

As shown in FIG. 12, since the frequency divider 208 is a ¼ frequency divider, the output signal Fout is the sum signal of ⅘ Fin or the difference signal of ⅘ Fin when N is 4.

According to the control signals of the control logic unit 210, a loop 1 is formed as shown in FIG. 12 when the mixer 203, the second switch 204, the first BPF 205, the frequency divider 208, and the fourth switch 209 are on, and ⅘ Fin remains while ⅘ fin is removed by the first BPF 205. Thus, the output frequency range of the output signal Fout, e.g., ⅘ fin, is ⅘ fmin~⅘fmax which corresponds to the second range Range 2 of FIG. 13, when the input frequency range of the frequency signal of the oscillator unit 201 is fmin~fmax.

Figure 13:
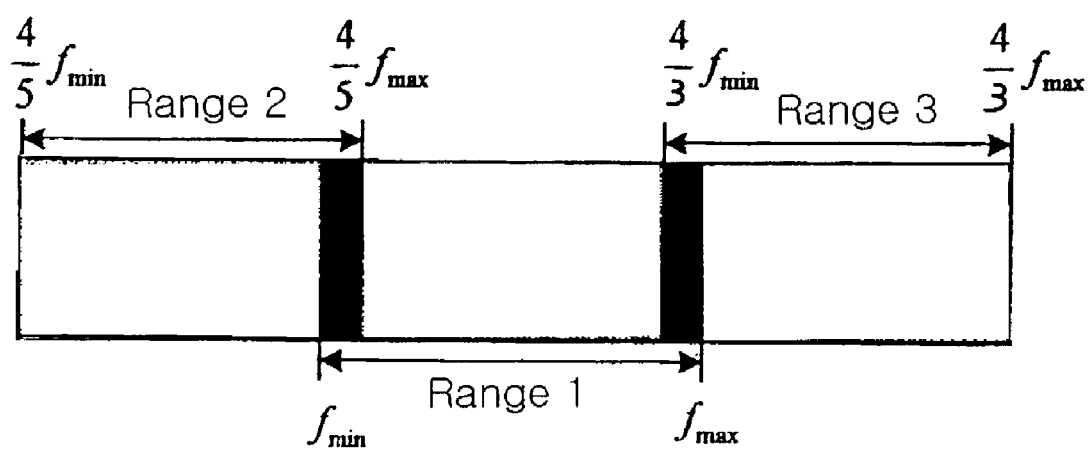
FIG. 13 is showing an operation and frequency tuning ranges of the wide band frequency generating apparatus shown in FIG. 12.

According to the control signals of the control logic unit 210, another loop 2 is formed as shown in FIG. 12 when the mixer 203, the third switch 206, the second BPF 207, the frequency divider 208, and the fourth switch 209 are on, and ⅘ Fin remains while ⅘ fin is removed by the second BPF 207, thereby generating the output signal having a third range Range 3 of FIG. 13.

Thus, the output frequency range of the output signal Fout, e.g., ⅘ fin, is ⅘ fin~⅘max as shown in FIG. 13, in the wideband frequency generating apparatus.

Since the first, second, and third ranges should be continuous without any gap between adjacent ranges, a desirable conditions are satisfied with the following formula 4.

$$\frac{4}{5}f_{max} > f_{min} \Rightarrow f_{max} > \frac{5}{4}f_{min} \quad \text{Formula 4}$$

$$\therefore f_{max} > 4/3\, f_{min}$$

Accordingly, the oscillator unit 201 must have frequency tuning range greater than 33%. When the frequency tuning range of the oscillator unit 201 is 33%, that is, fmax=⁴⁄₃fmin, 130% of the frequency tuning range can be obtained in the wideband frequency generating apparatus.

Figure 14:
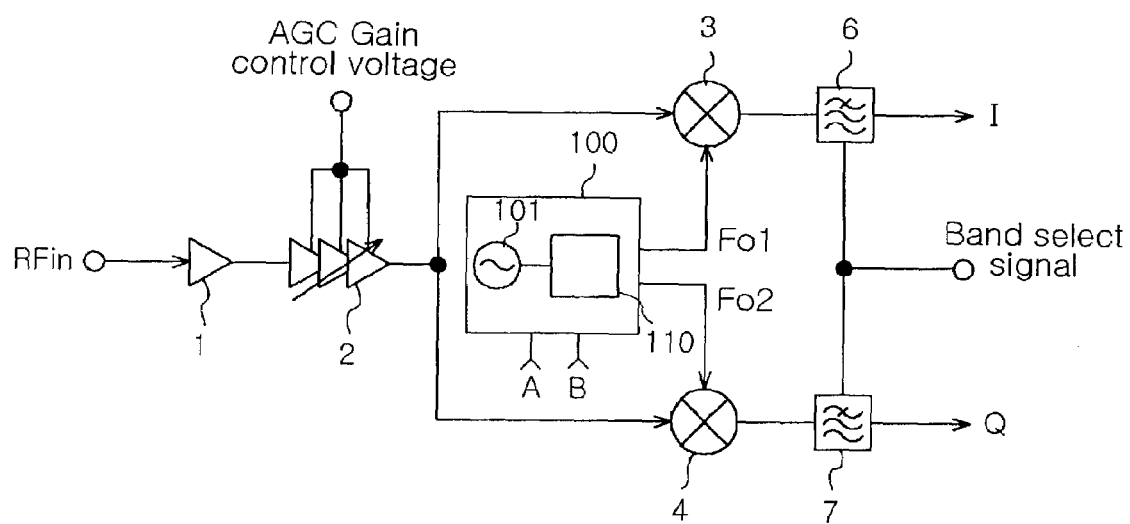
FIG. 14 is a block diagram of a direct conversion type tuner using the wide band frequency generating apparatus shown in FIGS. 6, 10, and 12.

FIG. 14 is a block diagram of a direct conversion type tuner using the wide band frequency generating apparatus shown in FIGS. 10, and 12 according to another embodiment of the present invention. Since wideband frequency generating apparatus can extend 33% of the frequency tuning range of the oscillator to 130%, the output signal having all desirable frequency tuning range can be obtained with a single oscillator.

As described above, the tuner having the wideband frequency generating apparatus can expand the frequency variable range by using a frequency dividing method of dividing a frequency signal into an output signal having an expanded range. The tuner can not only expand a frequency variable range more than a conventional tuner but also reduce a current consumption and a phase noise occurring in the switching array of a conventional frequency generating apparatus.

Although a few preferred embodiments of the present invention have been shown and described, it would be appreciated by those skilled in the art that changes may be made in this embodiment without departing from the principle and sprit of the invention, the scope of which is defined in the claims and their equivalent.

What is claimed is:

1. A wideband frequency generating apparatus in a tuner, comprises:
an oscillator unit generating a predetermined frequency signal from a minimum frequency of the oscillator fmin to a maximum frequency of the oscillator fmax wherein:

fmax>⁴⁄₃ fmin, fmax>¹²⁄₁₀ fmin, fmax>⁵⁄₄ fmin a mixer having a first input and a second input, the first input coupled to the oscillator unit to generate a difference signal by mixing the predetermined frequency signal of the oscillator unit with a signal inputted to the second input;
an output terminal;
a first switch tuned on/off and transmitting the predetermined frequency signal to the output terminal without substantive signal processing;
a second switch turned on/off and transmitting the difference signal of the mixer to the second input of the mixer to form a feedback loop;
a ½ frequency divider dividing the difference signal of the mixer into a ½ frequency signal;
a third switch tuned on/off and transmitting the ½ frequency signal to the second input of the mixer; and
a control logic unit generating on/off control signals turning on/off the mixer, the first switch, the second switch, the third switch in accordance with a selection of frequency generating ranges.

2. The wideband frequency generating apparatus of claim 1, wherein the second switch is connected between the output terminal and the second input of the mixer and transmits the signal appearing on the output terminal to the second input of the mixer.

3. The wideband frequency generating apparatus of claim 1, wherein the third switch is connected between the output terminal and the second input of the.

4. A wideband frequency generating apparatus in a tuner, comprises:
an oscillator unit generating a frequency signal having a predetermined frequency range ranging from a minimum oscillator frequency fmin to a maximum oscillator frequency fmax and wherein:

fmax>⁵⁄₄ fmin and fmax>¾ fmin an output terminal;
a first switch turned on/off and transmitting the frequency signal of the oscillator unit to the output terminal to output an output signal;
a mixer having a first input and a second input, the first input coupled to the oscillator unit to receive the frequency signal of the oscillator unit and generating a sum signal and a difference signal by mixing the frequency signal of the oscillator unit with a signal inputted to the second input of the mixer;
second and third switches turned on/off and each coupled to the mixer to receive one of the sum and difference signal;
a first band pass filter disposed between the second switch and the output terminal to pass a ⅘ frequency signal from the one of the sum and difference signals;
a second band pass filter disposed between the third switch and the output terminal to pass a ⅘ frequency signal from the one of the sum and difference signal;
a ¼ frequency divider coupled to the first and second band pass filters to divide one of the ⅘ frequency and the ⅘ frequency signal into a ¼ frequency signal;
a fourth switch transmitting the ¼ frequency signal of the ¼ frequency divider to the second input of the mixer; and
a control logic unit generating control signals in response to a selection of frequency tuning ranges to turn on and off the first through fourth switches, the mixer, the first and second band pass filters, and the frequency divider. mixer and transmits the signal appearing on the output terminal to the second input of the mixer.

5. The wideband frequency generating apparatus of claim 4, wherein the control logic is further configured to selectively turn the mixer on and off.

* * * * *